United States Patent
Kulkarni et al.

(10) Patent No.: US 10,016,728 B2
(45) Date of Patent: Jul. 10, 2018

(54) GAS SEPARATION MEMBRANE MODULE FOR REACTIVE GAS SERVICE

(71) Applicants: AIR LIQUIDE ADVANCED TECHNOLOGIES U.S. LLC, Houston, TX (US); L'Air Liquide, Societe Anonyme pour l'Etude et l'Exploitation des Procedes Georges Claude, Paris (FR); SAUDI ARABIAN OIL COMPANY, Dhahran (SA)

(72) Inventors: Sudhir S. Kulkarni, Wilmington, DE (US); Karl S. Beers, Upper Darby, PA (US); Jean-Pierre R. Ballaguet, Thenisy (FR); Milind M. Vaidya, Foothill Ranch, CA (US); Sebastien A. Duval, Neuilly sur Seine (FR)

(73) Assignees: L'Air Liquide Societe Anonyme Pour L'Etude Et L'Etude Et L'Exploitation Des Procedes Georges Claude, Paris (FR); Air Liquide Advanced Technolgies U.S. LLC, Houston, TX (US); Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/195,040

(22) Filed: Jun. 28, 2016

(65) Prior Publication Data
US 2017/0001149 A1    Jan. 5, 2017

Related U.S. Application Data

(63) Continuation-in-part of application No. 14/788,758, filed on Jun. 30, 2015.

(51) Int. Cl.
*B01D 53/22* (2006.01)
*B01D 63/02* (2006.01)
(Continued)

(52) U.S. Cl.
CPC .............. *B01D 63/02* (2013.01); *B01D 53/22* (2013.01); *B01D 63/043* (2013.01); *B01D 63/10* (2013.01);
(Continued)

(58) Field of Classification Search
CPC .................. B01D 71/24; B01D 63/024; B01D 2053/224; B01D 71/04; B01D 63/10;
(Continued)

(56) References Cited

U.S. PATENT DOCUMENTS 3,565,587 A * 2/1971 Graf .................... B01D 11/0261
134/61
3,570,545 A * 3/1971 Benteler .................... F16L 9/21
138/143

(Continued)

FOREIGN PATENT DOCUMENTS

GB    2 090 546    7/1982
JP    2007 127178  5/2007

OTHER PUBLICATIONS

Sunny "ASTM A333 Grade 6, Seamless Steel Pipe . . . Service _ Sunny Steel Enterprise Ltd" May 18, 2014 7 pages https://web.archive.org/web/20140518032956/http://www.sunnysteel.com/blog/index.php/astm-a333-grade-6/.*

(Continued)

*Primary Examiner* — Anthony Shumate
(74) *Attorney, Agent, or Firm* — Christopher J. Cronin (57) ABSTRACT

A gas separation membrane module includes a seal between a higher pressure gas and a lower pressure gas. The seal includes a compressible sealing member in between sealing surfaces. At least one of the sealing surfaces has corrosion-resistant cladding provided over either low alloy steel or high alloy steel. The cladding reduce the possibility of a seal failure due to corrosion of low alloy or high alloy steel (Continued)

exposed to acid gases or condensed moisture containing acid gases dissolved therein while at the same not requiring that all surfaces of the membrane module exposed to acid gases be provided with cladding.

20 Claims, 7 Drawing Sheets (51) Int. Cl.
    *B01D 63/10*     (2006.01)
    *B01D 63/04*     (2006.01)

(52) U.S. Cl.
    CPC .. *B01D 2053/224* (2013.01); *B01D 2257/304* (2013.01); *B01D 2257/504* (2013.01); *B01D 2313/04* (2013.01); *B01D 2313/23* (2013.01)

(58) Field of Classification Search
    CPC ...... B01D 53/22; B01D 63/02; B01D 63/043; B01D 2319/022; B01D 2257/504; B01D 2319/02; B01D 2313/23; B01D 2257/304; B01D 2313/04; B01D 2319/025
    See application file for complete search history.

(56) References Cited

U.S. PATENT DOCUMENTS

| | | | | |
|---|---|---|---|---|
| 3,753,704 | A * | 8/1973 | Manilla | B21C 23/22 419/28 |
| 4,610,789 | A * | 9/1986 | Barch | B01D 63/024 210/321.87 |
| 5,013,331 | A | 5/1991 | Edwards et al. | |
| 5,071,552 | A * | 12/1991 | Bikson | B01D 63/043 210/321.8 |
| 5,137,631 | A * | 8/1992 | Eckman | B01D 63/043 210/321.8 |
| 5,183,198 | A * | 2/1993 | Tamehiro | B23K 20/227 148/529 |
| 5,470,469 | A * | 11/1995 | Eckman | B01D 63/02 210/321.78 |
| 6,153,097 | A * | 11/2000 | Jensvold | B01D 63/026 210/321.79 |
| 7,758,670 | B2 * | 7/2010 | Wynn | B01D 53/22 210/321.78 |
| 2002/0003105 | A1 * | 1/2002 | McEvoy | B01D 61/38 210/497.1 |
| 2005/0029192 | A1 * | 2/2005 | Arnold | B01D 61/02 210/641 |
| 2005/0217485 | A1 | 10/2005 | Olapinski et al. | |
| 2006/0144777 | A1 * | 7/2006 | Kumano | B01D 61/022 210/321.79 |
| 2006/0151375 | A1 * | 7/2006 | Marui | B01D 63/02 210/321.88 |
| 2008/0011157 | A1 | 1/2008 | Wynn et al. | |
| 2008/0163621 | A1 * | 7/2008 | Johnson | B01J 15/005 60/517 |
| 2010/0028085 | A1 * | 2/2010 | Rocher | F16L 1/161 405/169 |
| 2011/0114560 | A1 * | 5/2011 | Konishi | B01D 61/12 210/650 |
| 2011/0121574 | A1 * | 5/2011 | Konishi | B01D 61/025 290/54 |
| 2014/0047982 | A1 * | 2/2014 | Fukuda | B01D 53/22 96/8 |
| 2014/0116248 | A1 * | 5/2014 | Matteucci | B01D 53/22 95/45 |
| 2014/0360365 | A1 * | 12/2014 | Wynn | B01D 53/22 95/45 |
| 2015/0144559 | A1 * | 5/2015 | Taniguchi | B01D 63/106 210/650 |
| 2015/0144560 | A1 * | 5/2015 | Taniguchi | B01D 63/12 210/650 |
| 2016/0023164 | A1 * | 1/2016 | Karode | B01D 65/003 96/8 |
| 2016/0184771 | A1 * | 6/2016 | Kulkarni | B01D 53/228 95/49 |

OTHER PUBLICATIONS

Ferrobend "ASTM A105 / A105N Flanges" Feb. 9, 2015 http://astm-a105n-flanges.blogspot.com/2015/02/astm-a105-a105n-flanges.html.*

International Search Report and Written Opinion for PCT/US2016/039799, dated Sep. 19, 2016.

\* cited by examiner

GAS SEPARATION MEMBRANE MODULE FOR REACTIVE GAS SERVICE

CROSS-REFERENCE TO RELATED APPLICATIONS

This application is a Continuation-In-Part of U.S. application Ser. No. 14/788,758, filed Jun. 30, 2015, the entire contents of which are incorporated herein by reference.

BACKGROUND

Field of the Invention

The present invention relates to an economical gas separation membrane module for use in the separation of gases from a reactive feed gas that includes sealing features that exhibit greater resistance to leaks.

Related Art

Many gas separation membrane modules include a plurality of hollow fibers arranged in a bundle where at least one end of the bundle is embedded in a tubesheet and the bundle is installed within a pressure vessel. The feed gas may contact the membrane bundle from the shell side (i.e., the outer surfaces of the hollow fibers) or from the tube/bore side of the hollow fibers (i.e., the inner surfaces of the hollow fibers).

When fed from the bore side, gas components preferentially permeate through the fiber wall from the fiber bores to spaces outside the fibers. These preferentially permeated gases are withdrawn from the shell side as a permeate stream through a permeate port. The residue stream, which is depleted in these preferentially permeating components, is withdrawn from a residue port.

Typically for higher pressure operation, in contrast, the feed is brought into contact with the hollow fiber bundle from the shell side. The feed flow path typically has an outside-in orientation, although the reverse orientation is also possible. The preferentially permeating gas components pass through the walls of the hollow fibers and into the bores of the hollow fibers. The preferentially permeating gas components are withdrawn from the permeate port as a permeate stream and the depleted feed gas (depleted in the preferentially permeating gas components) is withdrawn from the residue port as a residue stream.

While the above-described membrane modules are ordinarily satisfactory for many types of feed gases, they can potentially be susceptible to leaks (i.e., feed gas leak into permeate gas, feed gas leak into residue gas, or feed gas leak outside the module) when the module is put into acid gas service. By acid gas service, we mean that the feed gas is corrosive and contains acid gases such as $H_2S$ and $CO_2$, such as sour natural gas. This susceptibility to leaks is exacerbated by relatively high levels of acid gases in the feed gas, especially $H_2S$. For example, some have reported $H_2S$ concentrations for very sour or ultra-sour natural gas that are in double digit percentages and may reach even as high as 75 vol %.

Therefore, there is a need in the art of membrane-based gas separation for gas separation membrane modules that are not as susceptible to leaks.

SUMMARY OF THE INVENTION

It is an object to satisfy the above need.

Therefore, there is disclosed an acid gas-service gas separation membrane module, comprising: a hollow pressure vessel open at first and second ends made of carbon steel or a low alloy steel, the pressure vessel having a first end face at said first end and a second end face at said second end; a first end cap made of carbon steel or a low alloy steel sealing said first end of said pressure vessel at said first end face, said first end cap including a first port formed therein; a second end cap made of carbon steel or a low alloy steel sealing said second end of said pressure vessel at said second end face, said second end cap including a second port formed therein, said pressure vessel having a third port formed therein; a plurality of gas separation membranes disposed within the pressure vessel arranged as a bundle, one or both ends of the plurality of membranes being encased in solid polymer in sealing fashion to form a tubesheet(s) at an end(s) of the bundle, each of said membranes having a first side and a second side, each of said membranes being adapted and configured to separate an acid gas-containing feed gas fed to a first side thereof through permeation of gases through the membrane to a second side thereof so as to provide a lower pressure permeate gas on the second side and a higher pressure residue gas on the first side, the permeate gas being enriched in one or more gases compared to the residue gas; a first port tube made of a high alloy steel fluidly communicating between the first port and one of the membranes' first sides and the membranes' second sides; a second port tube made of a high alloy steel fluidly communicating between the second port and the other of the membranes' first sides and the membranes' second sides; and at least two compressible sealing elements comprising first and second compressible sealing elements. Said first compressible sealing element is compressed between a first pair of sealing surfaces selected from the group consisting of (i) an inner surface of the pressure vessel and an outer surface of one of said tubesheet(s), (ii) an outer surface of the first port tube and an inner surface of the first port, and (iii) an outer surface of the second port tube and an inner surface of the second port. At least one of said first pair of sealing surfaces is provided with a corrosion-resistant cladding. Said second compressible sealing element is compressed between a second pair of sealing surfaces selected from the group consisting of (i) an inner surface of the pressure vessel and an outer surface of one of said tubesheet(s), (ii) an outer surface of the first port tube and an inner surface of the first port, and (iii) an outer surface of the second port tube and an inner surface of the second port. At least one of said second pair of sealing surfaces being provided with a corrosion-resistant cladding.

There is also disclosed a method for the separation of an acid gas-containing feed gas, comprising the following steps. The above-disclosed membrane module is provided. An acid gas-containing feed gas is fed to the membrane module via the one of the ports. A permeate gas is withdrawn from the membrane module via different one of the ports. A residue gas is withdrawn from the membrane module via another of the ports.

Either or both of the membrane module and method may include one or more of the following aspects:

only one end of each of the plurality of membranes is encased in solid polymer in sealing fashion to form a single tubesheet at an end of the bundle; said first port tube is a permeate tube and the first port is a permeate port; said first pair of sealing surfaces is the outer surface of the permeate tube and the inner surface of the permeate port; said first compressible sealing element is a first O-ring installed in a groove formed in an outer diameter of the permeate tube, portions of the inner surface of the permeate port in contact with the first O-ring being provided with the corrosion-resistant cladding; said second port tube is a residue tube and the second port is a residue port; said second pair of sealing surfaces is the outer surface of the residue tube and the inner surface of the residue port; said second compressible sealing element is a second O-ring installed in a groove formed in an outer diameter of the residue tube, portions of the inner surface of the residue port in contact with the second O-ring being provided with the corrosion-resistant cladding; and said third port is a feed port.

only one end of each of the plurality of membranes is encased in solid polymer in sealing fashion to form a single tubesheet at an end of the bundle; said first port tube is a permeate tube and the first port is a permeate port; said first pair of sealing surfaces is the outer surface of the permeate tube and the inner surface of the permeate port; said first compressible sealing element is a first O-ring installed in a groove formed in an outer diameter of the permeate tube, portions of the inner surface of the permeate port in contact with the first O-ring being provided with the corrosion-resistant cladding; said second port tube is a feed gas tube and the second port is a feed gas port; said second pair of sealing surfaces is the outer surface of the feed gas tube and the inner surface of the feed port; said second compressible sealing element is a second O-ring installed in a groove formed in an outer diameter of the feed gas tube, portions of the inner surface of the feed port in contact with the second O-ring being provided with the corrosion-resistant cladding; and said third port is a residue port.

each end of each of the plurality of membranes is encased in solid polymer in sealing fashion to form a first tubesheet proximate the first port and a second tubesheet proximate the second port; said first port tube is a residue tube and the first port is a residue port; said second port tube is a feed gas tube and the second port is a feed gas port; said third port is a permeate port; said first pair of sealing surfaces is the outer surface of the first tubesheet and the inner surface of the pressure vessel adjacent the first tubesheet; said first compressible sealing element is a first O-ring installed in a groove formed in an outer diameter of the first tubesheet; portions of the inner surface of the pressure vessel in contact with the first O-ring being provided with the corrosion-resistant cladding; said second compressible sealing element is a second O-ring installed in a groove formed in an outer diameter of the second tubesheet; portions of the inner surface of the pressure vessel in contact with the second O-ring being provided with the corrosion-resistant cladding;

said at least two compressible sealing elements further comprise a third compressible sealing element installed between the first end face and an inwardly facing surface of said first end cap and a fourth compressible sealing element installed between the second end face and an inwardly facing surface of said second end cap, wherein: the third compressible sealing element is installed in a groove formed either in the first end face, the inwardly facing surface of said first end cap, or each of said first end face and said inwardly facing surface of said first end cap; either the first end face, the inwardly facing surface of said first end cap, or each of said first end face and said inwardly facing surface of said first end cap being provided with a corrosion-resistant cladding; the fourth compressible sealing element is installed in a groove formed either in the second end face, the inwardly facing surface of said second end cap, or each of said second end face and said inwardly facing surface of said second end cap; and either the second end face, the inwardly facing surface of said second end cap, or each of said second end face and said inwardly facing surface of said second end cap being provided with a corrosion-resistant cladding.

each of said third and fourth compressible sealing elements is a spiral gasket.

the membranes are configured as hollow fiber membranes or spiral-wrapped membranes.

the membranes are made of a glassy polymer or a rubbery polymer.

the pressure vessel is made of ASME SA333 Grade 6 seamless pipe.

the low alloy steel of the first and second end caps is SA350 LF2 Class 2, or ASTM 105N.

each of the claddings is selected from the group consisting of Hastelloy, Inconel, and ceramic.

the acid gas is sour natural gas containing at least 10% vol $H_2S$ the compressible sealing element is an O-ring, gasket, or cup seal the feed gas is fed to the membrane module via the third port, the permeate gas is withdrawn from the membrane module via the first port, and the residue gas is withdrawn from the membrane module via the second port.

the feed gas is fed to the membrane module via the second port, the permeate gas is withdrawn from the membrane module via the first port, and the residue gas is withdrawn from the membrane module via the third port.

DETAILED DESCRIPTION OF THE INVENTION

The gas separation membrane module is suitable for corrosive gas service. The membranes are installed in a pressure vessel capable of withstanding high internal pressure. The chief material of construction of the pressure vessel is a relatively inexpensive metal, such as low alloy steel, that requires a high corrosion allowance for use in pressurized service with corrosive gases. However, the susceptibility to corrosion exhibited by many relatively inexpensive metals may have the effect of barring their acceptance for use membrane modules for acid gas service.

In particular, we have determined that seals including relatively inexpensive and less corrosion-resistant metals fail because the metallic surfaces abutting one another at the seal are corroded, leaving a low-strength corrosion products in place at the seal. As the pressure difference (between higher pressure zones within the module to lower pressure zones) across this corroded seal is increased, the previously non-corroded seal fails because the low-strength corrosion products lack the strength necessary to prevent a leak through a path formed in the seal from the higher pressure zone to the lower pressure zone. Such a leak may be dangerous in the event of a leak of flammable gas from the membrane module. Such a leak may instead lead to a significant loss of performance of the membrane module as the gas separation is hampered due to the leak.

Without being bound by any particular theory, we believe that corrosion can occur in either of two ways. First, it may occur through exposure of the surface to gaseous $H_2S$ and $CO_2$ during normal operation or downtime. Second, and more likely the greater cause of corrosion, it may occur through exposure of the surface to minute amounts of $H_2S$ and $CO_2$-containing condensed moisture that may accumulate on the surface during downtime, transportation, or membrane bundle replacement.

While the metallic components of the membrane module may be made of a corrosion-resistant material in order to avoid this problem, another problem is created in its place: economic justification for a membrane-based gas separation solution. In many instances, the overall price of the engineering solution for achieving a given gas separation is what drives a decision to opt for a membrane-based gas separation solution versus a non-membrane-based gas separation solution.

Therefore, we propose to use a relatively low-cost metal for the metallic components of the gas separation membrane module and clad the surfaces of metallic components adjacent any seal that is especially susceptible to leaks and/or failure. By cladding the surfaces, we mean that the surface of at least one of the metallic components adjacent the seal is cladded. However, the surfaces of each of the two metallic components adjacent the seal may be cladded. The cladding may be any metallic material demonstrated to be corrosion resistant, such as Hastelloy, Inconel, or ceramic. The greatest pressure difference is experienced at seals sealing the feed gas from the permeate gas, so it is of greatest importance to clad those surfaces. Also of importance, albeit possibly of lesser importance than the feed gas/permeate gas seal, are the seals sealing the feed gas from the residue gas, the feed gas from the ambient atmosphere outside the membrane module, and the residue gas from the ambient atmosphere outside the membrane module.

Typically, compressible sealing elements are used in between the two metallic components making up the seal (either or both of which is cladded). A groove may be formed in one of the metallic components of the seal to receive the compressible sealing element so that the element is compressed in between the surface of the groove and the planar surface of the metallic component facing the grooved metallic component. While at a minimum, cladding should be provided on the non-grooved surface of the seal in question, a more corrosion-resistant seal is produced by cladding both the grooved surface and the non-grooved surface.

Alternatively, corresponding grooves may be formed in each of the metallic components forming the seal so that the compressible element is compressed in between the two grooved surfaces. In this case, cladding is preferably provided on each of the grooved surfaces.

Regardless of which surface is clad, the compressible sealing elements form a seal that prevents a bypass leak between a zone of relatively higher pressure (such as that containing the pressurized feed gas) and a zone of relatively lower pressure (such as that containing the permeate gas). The structure of the compressible sealing element is not limited and may have a configuration known in the field of gas separation membrane module seals. Typically, the compressible sealing element is configured as an O-ring, a planar gasket, a spiral gasket, or a cup seal. The material of the sealing elements is chosen to be resistant to the feed gas constituents, such as Viton™ (fluoroelastomer), EPDM (ethylene propylene diene terpolymer), Teflon™-coated materials (polytetrafluoroethylene), and Kalrez™ (perfluoroelastomer).

In one typical configuration for shell side-fed modules, feed gas enters the vessel though a feed gas port and flows into an annular space between inner diameter of the pressure vessel and an outer diameter of the membrane bundle. The feed then flows radially through the shell side of the fiber bundle from the circumferential surface of the bundle towards a residue/center tube. Residue gas, comprising gas components that do not readily permeate the membrane fiber, is collected in the center tube that is perforated to allow passage of the residue gas thereinto. The permeate gas, comprising feed components that do readily permeate the membrane fiber, flows through the walls of the fibers to the bore side and is collected at one or both sides of the bundle and flows into a permeate tube. The center tube typically extends longitudinally through the bundle and is either housed within the permeate tube or the permeate tube is housed within the center tube, preferably concentrically, within this tube.

The tube sheet(s) is formed by joining or sealing the hollow fibers with epoxy. The fiber lumens are opened on at least one tubesheet by cutting the tubesheet back to expose the bores of the fibers so as to allow permeate flow into or out of the bores as the case may be. The fibers on the other end typically remain sealed in epoxy, creating a pressure tight seal at the closed tubesheet. The residue tube extends from the open tube sheet to the unopened tube sheet on opposite side of the bundle. A porous support block is situated adjacent to the open tubesheet. This block provides a flow channel for the permeate exiting the bores of the fibers and also provides a mechanical support for the tube sheet to resist the feed gas pressure. An end plate is situated next to the porous support block. The end plate is held in place by screws and retaining rings. The end plate is machined to accommodate a flow channel adaptor. This flow channel adaptor is used to connect the bores, via the porous support block, to the permeate tube and out the permeate port. Finally, a centering ring (centering the bundle within the pressure vessel) may be added to facilitate bundle insertion into the vessel.

One end of the residue tube is closed while the other end is connected to the residue port. It is at this point that a seal is provided to seal the residue gas from the feed gas and the residue gas from the ambient atmosphere outside the membrane module. The seal includes a compressible sealing element in between an outer diameter of the residue tube and an inner diameter of the residue port of the associated end cap. Typically, either the outer diameter of the residue tube or the inner diameter of the residue port of the associated end cap (or both) is (are) grooved to accommodate the compressible sealing element. Typically, this compressible sealing element is an O-ring.

Similarly, one end of the permeate tube is closed while the other end is connected to the permeate port. Again, it is at this point that a seal is provided to seal the permeate gas from the feed gas and the permeate gas from the ambient atmosphere outside the membrane module. The seal includes a compressible sealing element in between an outer diameter of the permeate tube and an inner diameter of the permeate port of the associated end cap. Typically, either the outer diameter of the permeate tube or the inner diameter of the permeate port of the associated end cap (or both) is (are) grooved to accommodate the compressible sealing element. Typically, this compressible sealing element is also an O-ring.

For reasons of weight and cost, the end caps are typically dished. The end caps are sealed to the pressure vessel by compressing compressible sealing elements with a suitable amount of bolt compression in between each pair of inwardly facing end cap surface/pressure vessel end face. Typically, this compressible sealing element is a spiral gasket. This seal prevents the relatively higher pressure and sometimes flammable feed and residue gases from escaping into the atmosphere.

Optionally, high alloy steels may be used for certain metallic components of the membrane module, such as the permeate tube, the residue tube, and the flow channel adaptors. Their corrosion resistance may further ensure that the compressible sealing elements will stay secure even when exposed to corrosive conditions.

As described above, it is desirable to use, as a base material for the pressure vessel and end caps, a carbon steel or low alloy steel on grounds on material cost and strength properties. By "carbon steel", we mean steel made of iron and carbon. By "low alloy steel", we mean carbon steel alloyed with an amount of another metal not exceeding 4 wt %. A very wide variety of low alloy steels are well-known and commercially available from a wide variety of sources. For sour gas (natural gas not meeting pipeline specifications for $CO_2$ and/or $H_2S$) service in particular, the base material of the pressure vessel should be selected among the carbon steels offering resistance to hydrogen induced cracking as per the testing procedure described in NACE TM0284 (available from NACE International) and any other criteria optionally defined by the end user or guidelines described in NACE MR0175-ISO 15156 (Annex B) (available from NACE International). Another typical material for the pressure vessel is ASME SA333 Grade 6 seamless pipe (a particular type of carbon steel structure). Typically, the end caps may be made of SA350 LF2 steel or A105N steel. Each of the steels described above is well-known and commercially available from a wide variety of sources.

While the membrane bundle may be configured as a plurality of spiral wound sheets, typically it is a plurality of hollow fibers. At least one end of the bundle is embedded in a tubesheet. The bundle is installed in the pressure vessel. The feed gas may contact the membrane bundle from the shell side or from the tube/bore side of the hollow fibers.

When fed from the bore side, gas components preferentially permeate through the fiber wall and the resulting permeate is withdrawn from the shell side through a permeate port. The residue stream which is depleted in these preferentially permeating components is withdrawn from the residue port. O-rings between the tube sheet and vessel walls seal the higher pressure feed and residue streams from the permeate.

Typically for higher pressure operation, the feed is brought in contact with the hollow fiber bundle from the shell side. The feed flow path is typically outside—in although the reverse orientation is also possible. The preferentially permeating gas components pass through the fiber walls into the bores and are withdrawn as permeate gas from the permeate port. The residue stream which is depleted in these preferentially permeating components is withdrawn from the residue port. O-rings are used to seal the higher pressure feed and residue streams from the permeate.

Other noteworthy seals are at the end faces of the pressure vessel and inwardly facing surfaces of the end caps. These seals prevent the high pressure and sometimes flammable feed and residue streams from escaping into the atmosphere. Typically, the compressible sealing elements at these seals are O-rings or gaskets, such as spiral-wound gaskets. For each of these seals, a groove may be formed in the end face of the pressure vessel or in the inwardly facing surface of the associated end cap or in both so as to receive the compressible sealing element. If a groove is only formed in one of these sealing surfaces, either or both of the sealing surfaces (i.e., the grooved surface and the opposing planar sealing surface) is provided with the corrosion-resistant cladding. If a groove is formed in each of these sealing surfaces, either or both each of the sealing surfaces is similarly provided with the corrosion-resistant cladding material.

Cladding is a well-known process to bond dissimilar metals or bond a ceramic material to a metal. High pressure and high temperature is supplied through a device applying electrical and/or mechanical energy so as to form a metallurgical bond between the substrate (e.g. carbon steel, low alloy steel, or high alloy carbon steel) and the overlay corrosion-resistant metal of the cladding (e.g. Hastelloy, Inconel, or ceramic). Various cladding techniques which induce fusion utilizing lasers, infra-red heating, explosive bonding etc. are known. Typically, the cladding is performed to specifications described in the SA02-SAMSS-012 standard (A reference to ASME, section IX (Corrosion protection-Weld Metal Overlay). Hot wire arc welding, especially gas-tungsten arc welding (GTAW), is a particularly suitable technique for depositing a corrosion resistant alloy as a cladding on the surface of the substrate. Other methods are well-known in the coating and metal working arts for creating a ceramic layer on top of a metal substrate.

The bundle of membranes can be configured as a single unit adapted for simple drop-in installation into a pressure vessel. Alternatively, multiple bundles may readily be inserted into a pressure vessel as disclosed by U.S. Pat. No. 5,137,631 and U.S. Pat. No. 5,470,469 and arranged so as to operate in series or in parallel. The number of bundles in a single unit may vary from 2-10, preferably 2-4.

Figure 1:
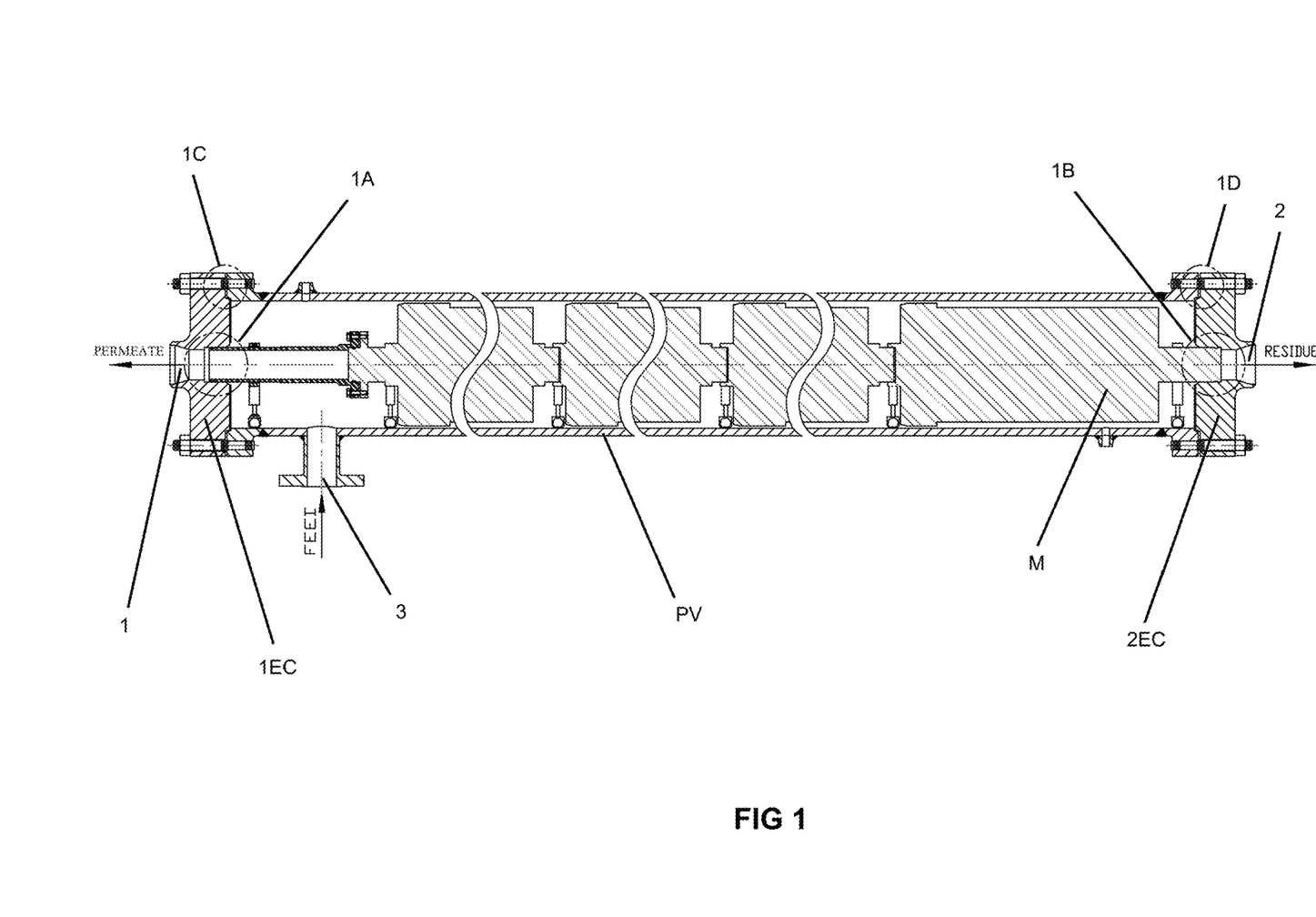
FIG. 1 is a cross-sectional schematic view of a first embodiment of the membrane module of the invention with parts removed.

As best illustrated in FIG. 1, a first embodiment of the membrane module includes a plurality of bundles of gas separation membranes M are used within a single pressure vessel PV. The interconnections between bundles M use O-rings that seal against the corrosion resistant surfaces of the center tubes or flow channel adaptors. A first port 1 is formed in the first end cap EC1 while a second port 2 is formed in the second end cap EC2. A third port 3 is formed in the pressure vessel.

In a first mode of operation for the membrane module of FIG. 1, the membrane module is shell-fed, the third port 3 is a feed gas port, the first port 1 is a permeate port, the second port 2 is a residue port, and the membranes are hollow fiber membranes. In this configuration, feed gas enters the pressure vessel PV though the feed gas port 3 and flows into an annular space between inner diameter of the pressure vessel PV and an outer diameter of the membrane bundle M. The feed gas then flows radially inwardly through the bundle from the circumferential surface of the bundle towards a residue center tube (not shown). Residue gas, comprising gas components that do not readily permeate through the fiber walls, is collected in residue center tube which is perforated to allow passage of the residue gas thereinto. The permeate gas, comprising feed components that do readily permeate the fiber walls, flows through the walls of the fibers to the bore side of the fibers and is collected at one or both sides of the membrane bundles M at a tubesheet(s) and flows into a permeate center tube (not shown) via flow channel adaptors that channel flows of permeate gas from the bores of the fiber to the permeate center tube. The residue center tube typically extends longitudinally through the bundle and is either housed within the permeate center tube or the permeate center tube is housed within the residue center tube, preferably concentrically, within this tube. Regardless of whether one is disposed within the other, the permeator center tube and flow channel adaptors are made with a high alloy steel. The permeate center tube is connected to the first port tube PT1 (the permeate tube) to allow the permeate to flow out of the membrane module via the first port 1 (the permeate port). Alternatively, the permeate center tube and the first port tube PT1 comprise one integral tube. The residue center tube is connected to the second port tube PT2 (the residue tube) to allow the residue to flow out of the membrane module via the second port 2 (the residue port).

In a second mode of operation for the membrane module of FIG. 1, the membrane module is bore-fed, the second port 2 is a feed gas port, the first port 1 is a permeate port, the third port 3 is a residue port, and the membranes are hollow fibers. In this configuration, feed gas enters the pressure vessel PV via the feed gas port into the second port tube 2 (the feed gas tube) and then into a perforated feed gas center tube. The feed gas exits the feed gas center tube via the perforations and travels axially outwardly through the bundle. Residue gas, comprising gas components that do not readily permeate through the fiber walls, collects in an annular space between an outer surface of the membrane bundles M, flows to the end of the pressure vessel PV opposite the first port 1 and exits the pressure vessel PV via the third port 3. The permeate gas, comprising feed components that do readily permeate the fiber walls, flows through the walls of the fibers to the bore side of the fibers and is collected at a tubesheet(s) at one or both sides of the membrane bundles M and flows into a permeate center tube (not shown) via flow channel adaptors that channel flows of permeate gas from the bores of the fibers to the permeate center tube. The residue center tube typically extends longitudinally through the bundle and is either housed within the permeate center tube or the permeate center tube is housed within the residue center tube, preferably concentrically, within this tube. Regardless of whether one is disposed within the other, the permeator center tube and flow channel adaptors are made with a high alloy steel. The permeate center tube is connected to the first port tube PT1 (the permeate tube) to allow the permeate to flow out of the membrane module via the first port 1 (the permeate port). Alternatively, the permeate center tube and the first port tube PT1 comprise one integral tube.

Figure 1A:
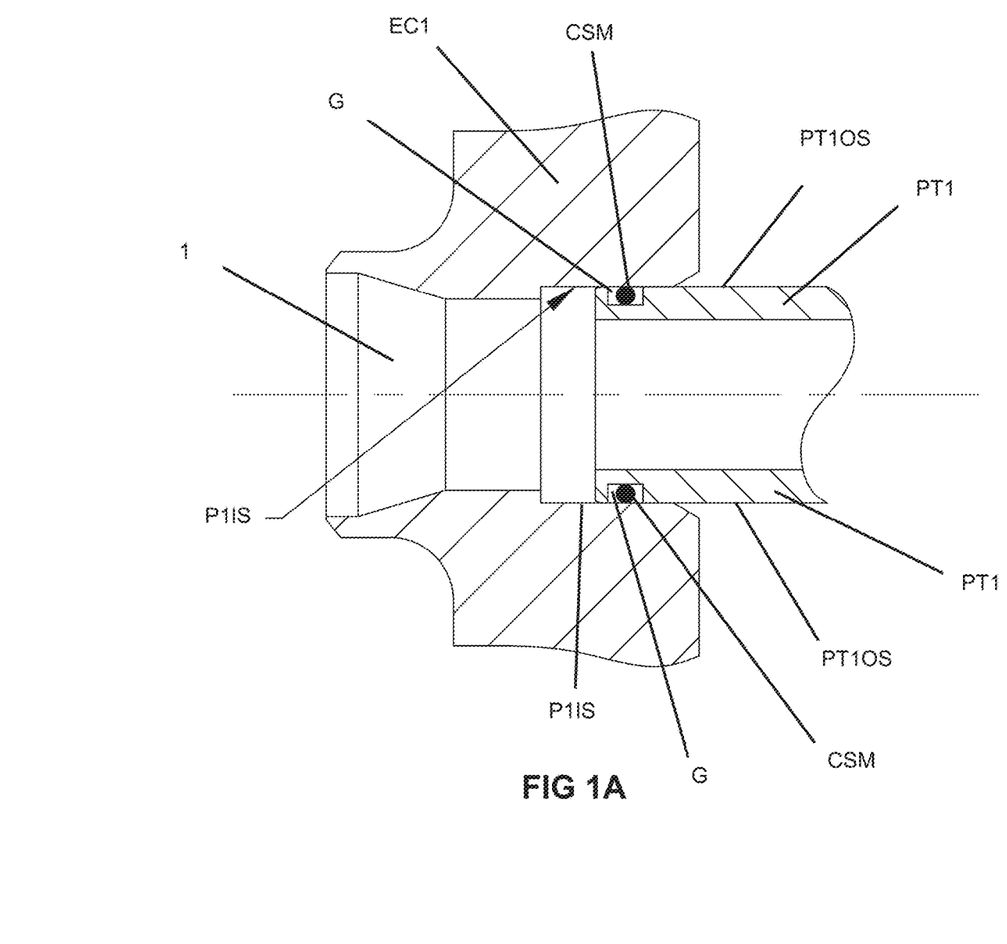
FIG. 1A is a detailed portion of the membrane module of FIG. 1 with parts removed for clarity showing a first seal.

As best illustrated in FIG. 1A, a seal 1A of the membrane module of FIG. 1 is made up of a compressible sealing element CSE that is received in a groove G and which is compressed in between two sealing surfaces: the outer surface PT1 OS of the first port tube PT1 and the inner surface P1IS of the first port 1. Typically, the first port tube PT1 is made of a high alloy steel and the first end cap EC1 is made of carbon steel or a low alloy steel. While the outer surface PT1OS of the first port tube PT1 or the inner surface P1IS of the first port 1 may be provided with cladding, typically, only the non-grooved surface (the inner surface P1IS) is cladded. The cladding is made of a corrosion-resistant material as discussed above.

Figure 1B:
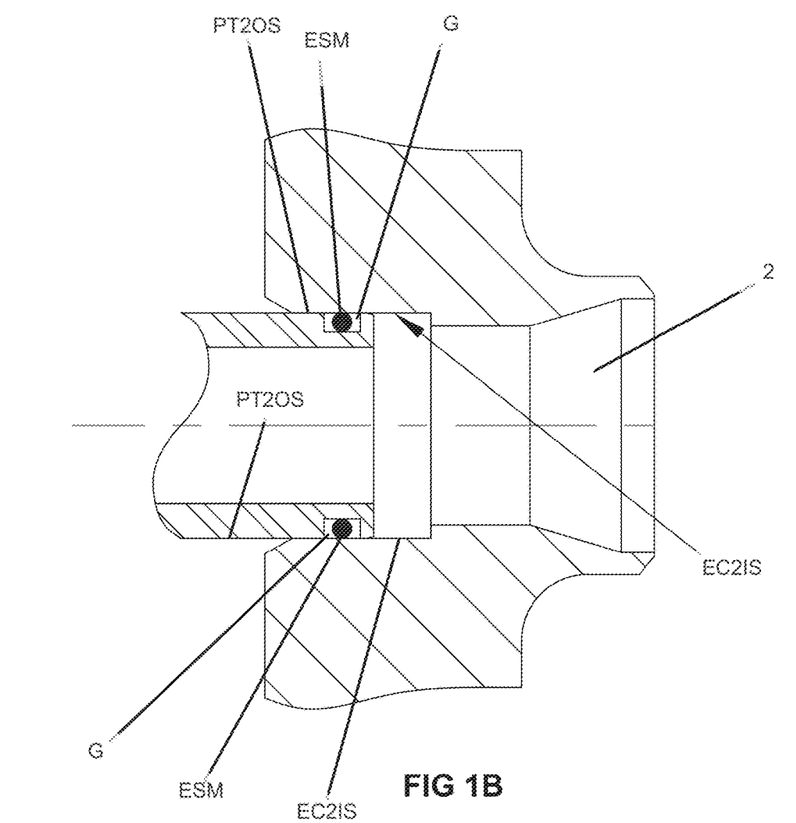
FIG. 1B is another detailed portion of the membrane module of FIG. 1 with parts removed for clarity showing a second seal.

As best illustrated in FIG. 1B, a seal 1B of the membrane module of FIG. 1 is made up of a compressible sealing element CSE that is received in a groove G and which is compressed in between two sealing surfaces: the outer surface PT2OS of the second port tube PT2 and the inner surface P2IS of the second port 2. Typically, the second port tube PT2 is made of a high alloy steel and the second end cap EC2 is made of carbon steel or a low alloy steel. While the outer surface PT2OS of the second port tube PT2 or the inner surface P2IS of the second port 2 may be provided with cladding, typically, only the non-grooved surface (the inner surface P2IS) is cladded. The cladding is made of a corrosion-resistant material as discussed above.

Figure 1C:
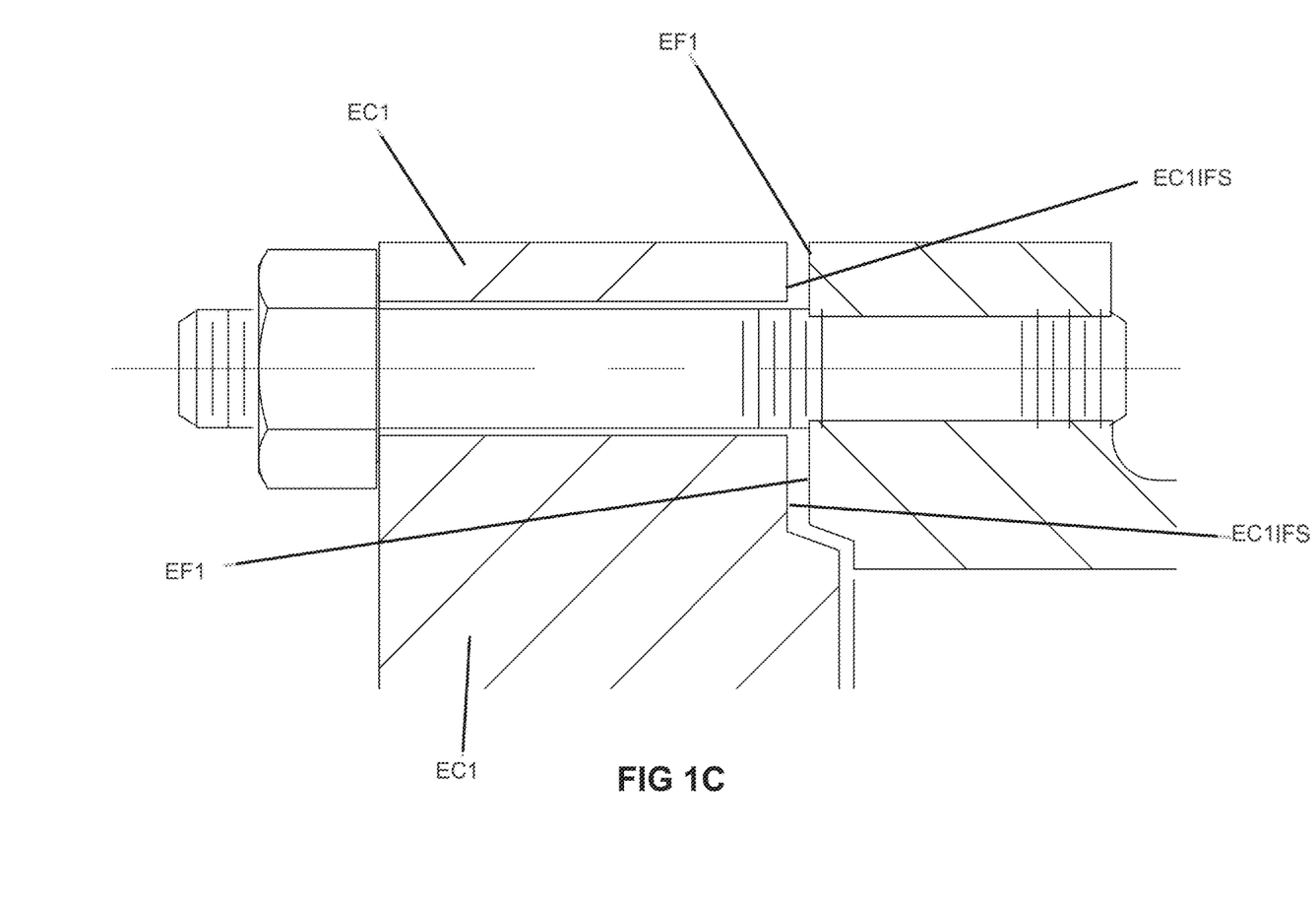
FIG. 1C is yet another detailed portion of the membrane module of FIG. 1 with parts removed for clarity showing a third seal.

As best illustrated in FIG. 1C, a seal 1C of the membrane module of FIG. 1 is made up of a compressible sealing element (not shown) that is compressed in between two sealing surfaces: a first end face EF1 of the pressure vessel PV and an inwardly facing surface EC1IFS of the first end cap EC1. Typically, each of the pressure vessel PV and first end cap EC1 is made of carbon steel or a low alloy steel. One or both of the first end face EF1 of the pressure vessel PV and the inwardly facing surface EC1IFS of the first end cap EC1 is provided with cladding. The cladding is made of a corrosion-resistant material a discussed above. Typically, the compressible sealing element is a spiral gasket.

Figure 1D:
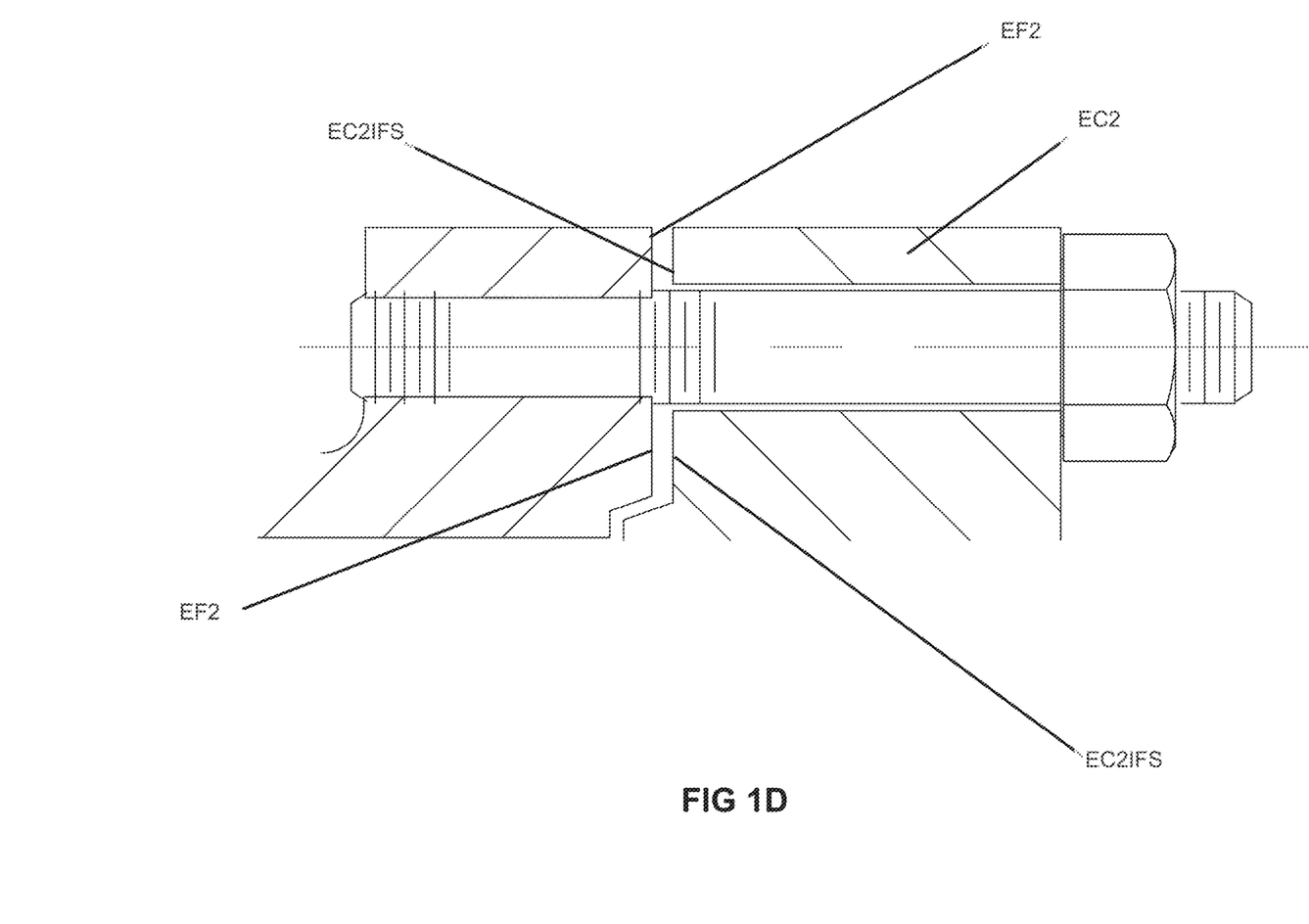
FIG. 1D is still another detailed portion of the membrane module of FIG. 1 with parts removed for clarity showing a fourth seal.

As best illustrated in FIG. 1D, a seal 1D of the membrane module of FIG. 1 is made up of a compressible sealing element (not shown) that is compressed in between two sealing surfaces: a second end face EF2 of the pressure vessel PV and an inwardly facing surface EC2IFS of the second end cap EC2. Typically, each of the pressure vessel PV and first end cap EC2 is made of carbon steel or a low alloy steel. One or both of the first end face EF2 of the pressure vessel PV and the inwardly facing surface EC2IFS of the second end cap EC2 is provided with cladding. The cladding is made of a corrosion-resistant material as discussed above. Typically, the compressible sealing element is a spiral gasket.

Figure 2:
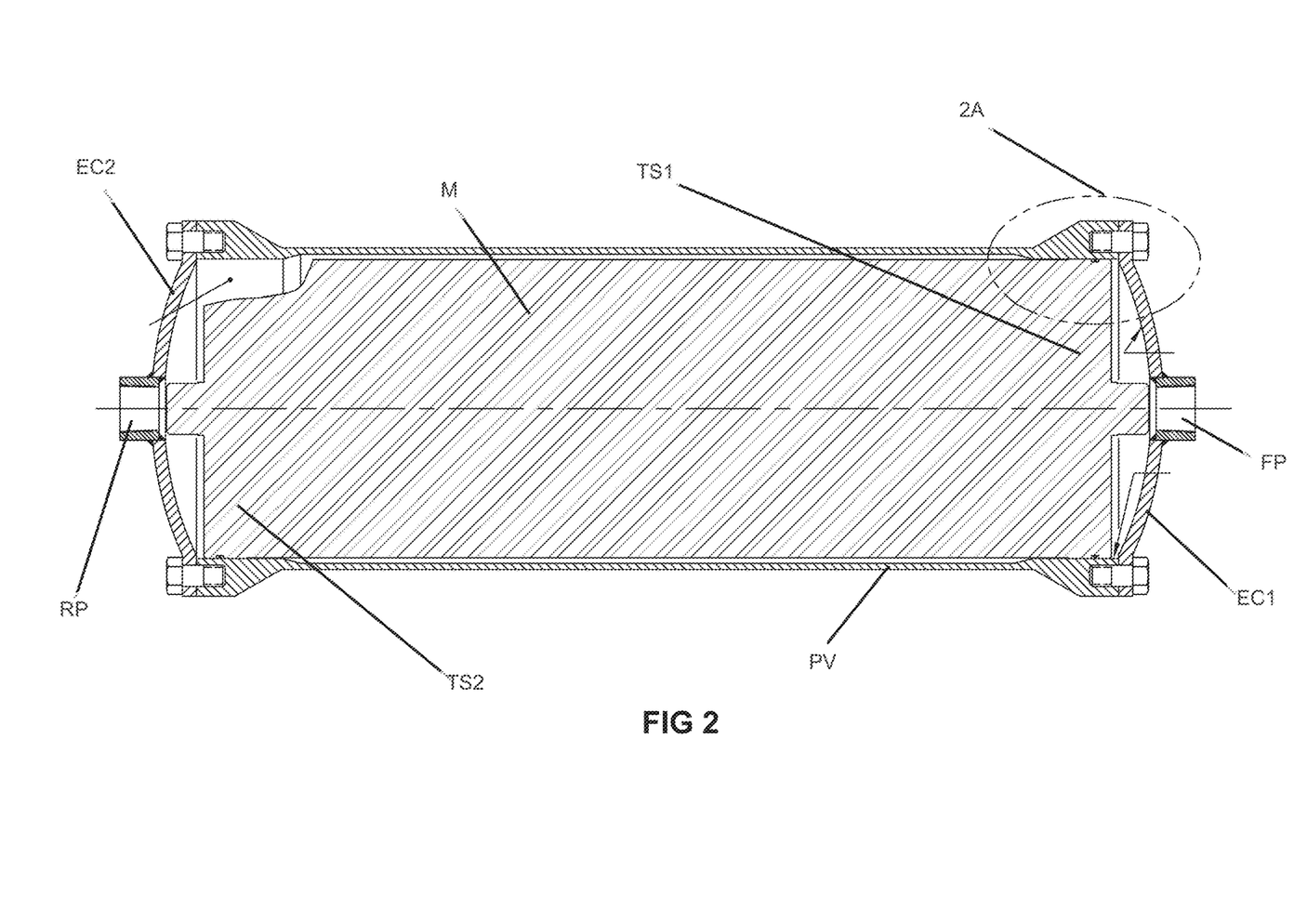
FIG. 2 is a cross-sectional schematic view of a second embodiment of the membrane module of the invention with parts removed.

As best illustrated in FIG. 2, a second embodiment of the membrane module includes a single membrane bundle M installed in a pressure vessel PV that is bore side-fed. Feed gas enters the pressure vessel PV via a feed gas port FP formed in the first end cap EC1 and is distributed to contact the first tubesheet TS1 of the bundle M. In this configuration, the tubesheets TS1, TS2 on both ends of the bundle M are cut open to expose the hollow fiber open ends and allow the feed gas to travel through the fiber bore to the residue end of the bundle M adjacent the second tubesheet TS2 and exit the pressure vessel via the residue port RP formed in the second end cap EC2. Permeating gases travel through the fiber walls and thenceforth radially outward into the annular space AS between the outer surface of the bundle M and an inner surface of the pressure vessel PV. The permeate gas then exits through a permeate port (not shown) formed in the pressure vessel PV.

Figure 2A:
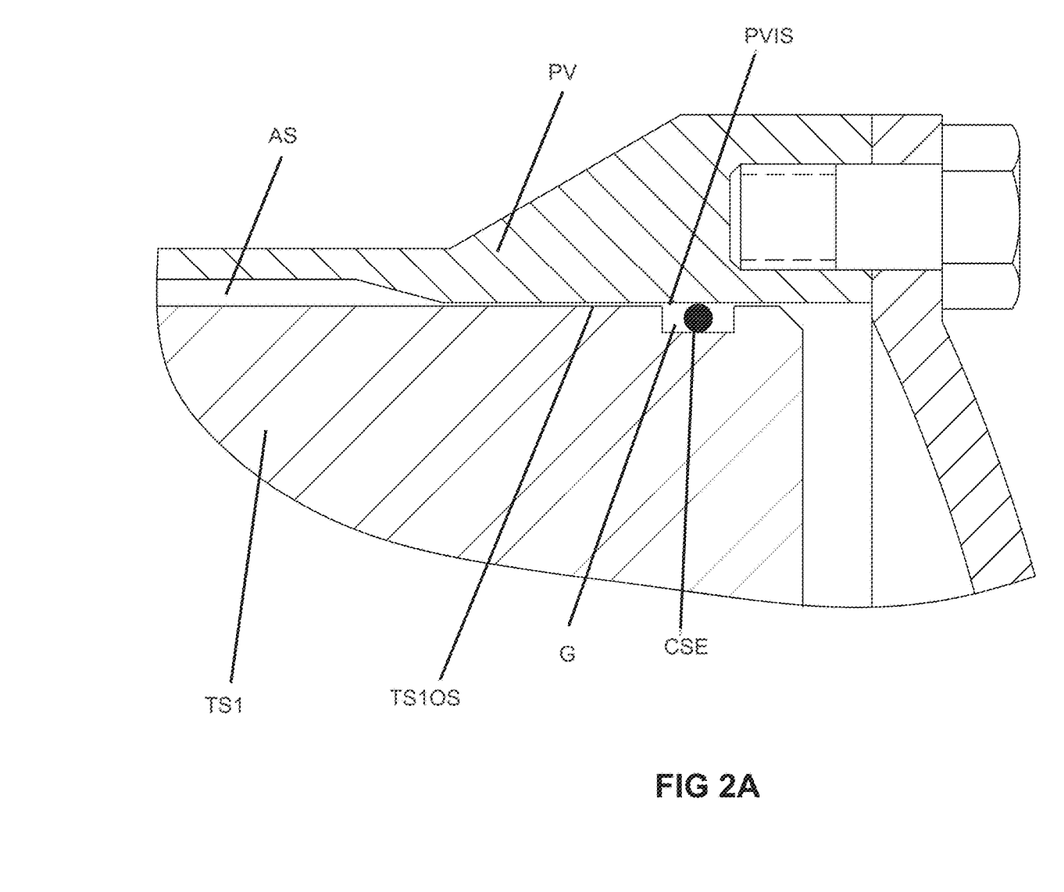
FIG. 2A is a detailed portion of the membrane module of FIG. 2 with parts removed for clarity showing a first seal.

In this second embodiment, the feed and residue gases need to be sealed against the permeate shell side space in the annulus between the outer surface of the bundle M and the inner surface of the pressure vessel PV. As best illustrated in FIG. 2A, a compressible sealing elements CSE is received in a groove G and compressed between an inner surface PVIS of the pressure vessel PV and an outer surface TS1OS of the first tubesheet TS1. The pressure vessel PV is made of carbon steel or a low alloy steel. The inner surface PVIS of the pressure vessel PV is provide with cladding made of a corrosion-resistant material as discussed above. Typically, the compressible sealing element is an O-ring this seal between the vessel inner diameter and the tubesheet diameters. Grooves may be cut in the tubesheet to constrain the O-rings.

While the embodiments shown in FIGS. 1-2A describe the use of cladding to form reliable sealing elements when using hollow fiber membrane bundles, the invention can be generalized to other membrane configurations (spiral-wound or plate-and-frame) when a seal needs to be formed against the inside of the pressure vessel. In these instances too, cladding of relatively small sealing surfaces with a higher cost corrosion resistant material enables secure sealing while the bulk of the vessel is made with the low cost steel.

Regardless of the configuration, embodiment or mode of the membrane module, the invention renders the membrane module suitable for gas separation of very sour or ultra-sour natural gas mixtures having $H_2S$ concentrations of at least 5 vol %, as high as 10 vol %, even as high as 60 vol %, and even as high as 75 vol %

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. An acid gas-service gas separation membrane module, comprising:
   a hollow pressure vessel open at first and second ends made of carbon steel or a low alloy steel, the pressure vessel having a first end face at said first end and a second end face at said second end;
   a first end cap made of carbon steel or a low alloy steel, sealing said first end of said pressure vessel at said first end face, said first end cap including a first port formed therein;
   a second end cap made of carbon steel or a low alloy steel, sealing said second end of said pressure vessel at said second end face, said second end cap including a second port formed therein, said pressure vessel having a third port formed therein;
   a plurality of gas separation membranes disposed within the pressure vessel arranged as a bundle, the plurality of membranes being encased in a solid polymer tubesheet at at least one end of the bundle in sealing fashion, each of said membranes having a first side and a second side, each of said membranes being adapted and configured to separate an acid gas-containing feed gas fed to a first side thereof through permeation of gases through the membrane to a second side thereof so as to provide a lower pressure permeate gas on the second side and a higher pressure residue gas on the first side, the permeate gas being enriched in one or more gases compared to the residue gas;
   a first port tube made of a high alloy steel, fluidly communicating between the first port and one of the membranes' first sides and the membranes' second sides;
   a second port tube made of a high alloy steel, fluidly communicating between the second port and the other of the membranes' first sides and the membranes' second sides; and
   at least two compressible sealing elements comprising first and second compressible sealing elements, wherein:
   said first compressible sealing element is compressed between an outer surface of the first port tube and an inner surface of the first port, at least one of said first port tube outer surface and said first port inner surface being provided with a corrosion-resistant cladding;
   said second compressible sealing element being compressed between an outer surface of the second port tube and an inner surface of the second port, at least one of said second port tube outer surface and said second port inner surface being provided with a corrosion-resistant cladding, wherein:
   said first port tube is a permeate tube and said first port is a permeate port;
   said first compressible sealing element is a first O-ring installed in a groove formed in an outer diameter of the permeate tube;
   portions of the inner surface of the permeate port in contact with the first O-ring are provided with the corrosion-resistant cladding;
   said second port tube is a residue tube and the second port is a residue port;
   said second compressible sealing element is a second O-ring installed in a groove formed in an outer diameter of the residue tube;

portions of the inner surface of the residue port in contact with the second O-ring are provided with the corrosion-resistant cladding; and said third port is a feed port.

2. The membrane module of claim 1, wherein said at least two compressible sealing elements further comprise a third compressible sealing element installed between the first end face and an inwardly facing surface of said first end cap and a fourth compressible sealing element installed between the second end face and an inwardly facing surface of said second end cap, wherein:

the third compressible sealing element is installed in a groove formed either in the first end face, the inwardly facing surface of said first end cap, or each of said first end face and said inwardly facing surface of said first end cap;

either the first end face, the inwardly facing surface of said first end cap, or each of said first end face and said inwardly facing surface of said first end cap being provided with a corrosion-resistant cladding;

the fourth compressible sealing element is installed in a groove formed either in the second end face, the inwardly facing surface of said second end cap, or each of said second end face and said inwardly facing surface of said second end cap; and either the second end face, the inwardly facing surface of said second end cap, or each of said second end face and said inwardly facing surface of said second end cap being provided with a corrosion-resistant cladding.

3. The membrane module of claim 2, wherein each of said third and fourth compressible sealing elements is a spiral gasket.

4. The membrane module of claim 1, wherein the membranes are configured as hollow fiber membranes or spiral-wrapped membranes.

5. The membrane module of claim 1, wherein the membranes are made of a glassy polymer or a rubbery polymer.

6. The membrane module of claim 1, wherein the pressure vessel is made of ASME SA333 Grade 6 seamless pipe.

7. The membrane module of claim 1, wherein the low alloy steel of the first and second end caps is SA350 LF2 Class 2, or ASTM 105N.

8. The membrane module of claim 1, wherein the compressible seals are O-rings, gaskets, or cup seals.

9. A method for the separation of an acid gas-containing feed gas, comprising the steps of:

providing the membrane module of claim 1;

feeding an acid gas-containing feed gas to the membrane module via one of said ports;

withdrawing a permeate gas from the membrane module via another of said ports; and withdrawing a residue gas from the membrane module via a further other of said ports, wherein the feed gas is fed to the membrane module via the third port, the permeate gas is withdrawn from the membrane module via the first port, and the residue gas is withdrawn from the membrane module via the second port.

10. The method of claim 9, wherein the acid gas is sour natural gas containing at least 5% vol $H_2S$.

11. An acid gas-service gas separation membrane module, comprising:

a hollow pressure vessel open at first and second ends made of carbon steel or a low alloy steel, the pressure vessel having a first end face at said first end and a second end face at said second end;

a first end cap made of carbon steel or a low alloy steel, sealing said first end of said pressure vessel at said first end face, said first end cap including a first port formed therein;

a second end cap made of carbon steel or a low alloy steel, sealing said second end of said pressure vessel at said second end face, said second end cap including a second port formed therein, said pressure vessel having a third port formed therein;

a plurality of gas separation membranes disposed within the pressure vessel arranged as a bundle, the plurality of membranes being encased in a solid polymer tubesheet at at least one end of the bundle in sealing fashion, each of said membranes having a first side and a second side, each of said membranes being adapted and configured to separate an acid gas-containing feed gas fed to a first side thereof through permeation of gases through the membrane to a second side thereof so as to provide a lower pressure permeate gas on the second side and a higher pressure residue gas on the first side, the permeate gas being enriched in one or more gases compared to the residue gas;

a first port tube made of a high alloy steel, fluidly communicating between the first port and one of the membranes' first sides and the membranes' second sides;

a second port tube made of a high alloy steel, fluidly communicating between the second port and the other of the membranes' first sides and the membranes' second sides; and at least two compressible sealing elements comprising first and second compressible sealing elements, wherein:

said first compressible sealing element is compressed between an outer surface of the first port tube and an inner surface of the first port, at least one of said first port tube outer surface and said first port inner surface being provided with a corrosion-resistant cladding;

said second compressible sealing element being compressed between an outer surface of the second port tube and an inner surface of the second port, at least one of said second port tube outer surface and said second port inner surface being provided with a corrosion-resistant cladding, wherein:

said first port tube is a permeate tube and the first port is a permeate port;

said first compressible sealing element is a first O-ring installed in a groove formed in an outer diameter of the permeate tube;

portions of the inner surface of the permeate port in contact with the first O-ring are provided with the corrosion-resistant cladding;

said second port tube is a feed gas tube and the second port is a feed gas port;

said second compressible sealing element is a second O-ring installed in a groove formed in an outer diameter of the feed gas tube, portions of the inner surface of the feed gas port in contact with the second O-ring being provided with the corrosion-resistant cladding; and said third port is a residue port.

12. A method for the separation of an acid gas-containing feed gas, comprising the steps of:

providing the membrane module of claim 11;

feeding an acid gas-containing feed gas to the membrane module via one of said ports;

withdrawing a permeate gas from the membrane module via another of said ports; and withdrawing a residue gas from the membrane module via a further other of said ports, wherein the feed gas is fed to the membrane module via the second port, the permeate gas is withdrawn from the membrane module via the first port, and the residue gas is withdrawn from the membrane module via the third port.

13. The membrane module of claim 11, wherein said at least two compressible sealing elements further comprise a third compressible sealing element installed between the first end face and an inwardly facing surface of said first end cap and a fourth compressible sealing element installed between the second end face and an inwardly facing surface of said second end cap, wherein:

the third compressible sealing element is installed in a groove formed either in the first end face, the inwardly facing surface of said first end cap, or each of said first end face and said inwardly facing surface of said first end cap;

either the first end face, the inwardly facing surface of said first end cap, or each of said first end face and said inwardly facing surface of said first end cap being provided with a corrosion-resistant cladding;

the fourth compressible sealing element is installed in a groove formed either in the second end face, the inwardly facing surface of said second end cap, or each of said second end face and said inwardly facing surface of said second end cap; and either the second end face, the inwardly facing surface of said second end cap, or each of said second end face and said inwardly facing surface of said second end cap being provided with a corrosion-resistant cladding.

14. The membrane module of claim 13, wherein each of said third and fourth compressible sealing elements is a spiral gasket.

15. The membrane module of claim 11, wherein the membranes are configured as hollow fiber membranes or spiral-wrapped membranes.

16. The membrane module of claim 11, wherein the membranes are made of a glassy polymer or a rubbery polymer.

17. The membrane module of claim 11, wherein the pressure vessel is made of ASME SA333 Grade 6 seamless pipe.

18. The membrane module of claim 11, wherein the low alloy steel of the first and second end caps is SA350 LF2 Class 2, or ASTM 105N.

19. The membrane module of claim 11, wherein the compressible seals are O-rings, gaskets, or cup seals.

20. The method of claim 12, wherein the acid gas is sour natural gas containing at least 5% vol $H_2S$.

* * * * *